(12) United States Patent
Konishi et al.

(10) Patent No.: US 10,533,471 B2
(45) Date of Patent: Jan. 14, 2020

(54) INTERNAL COMBUSTION ENGINE

(71) Applicant: HONDA MOTOR CO., LTD., Tokyo (JP)

(72) Inventors: Yukio Konishi, Wako (JP); Kazushi Tada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 15/611,899

(22) Filed: Jun. 2, 2017

(65) Prior Publication Data

US 2017/0362975 A1 Dec. 21, 2017

(30) Foreign Application Priority Data

Jun. 16, 2016 (JP) .................................. 2016-119494
Nov. 18, 2016 (JP) .................................. 2016-225405

(51) Int. Cl.

| | | |
|---|---|---|
| *F01M 13/04* | (2006.01) | |
| *F02F 1/36* | (2006.01) | |
| *F02B 75/22* | (2006.01) | |
| *B01D 45/16* | (2006.01) | |
| *B01D 45/08* | (2006.01) | |

(Continued)

(52) U.S. Cl.
CPC ............ *F01M 13/04* (2013.01); *F02B 75/22* (2013.01); *F02F 1/36* (2013.01); *B01D 45/08* (2013.01); *B01D 45/16* (2013.01); *F01M 13/00* (2013.01); *F01M 13/0416* (2013.01); *F01M 2013/0411* (2013.01); *F01M 2013/0422* (2013.01);

(Continued)

(58) Field of Classification Search
CPC ........... F01M 13/04; F01M 2013/0411; F01M 13/00; F01M 13/0416; F01M 2013/0422; F02B 75/22; B01D 45/08; B01D 45/16; F02M 25/06; F02D 2250/08

USPC ................... 123/41.79, 572, 573, 574, 41.86
See application file for complete search history.

(56) References Cited

U.S. PATENT DOCUMENTS 3,533,385 A * 10/1970 Bennett ................. F01M 13/04
123/573
8,511,291 B2 * 8/2013 Hirano ................. F01M 13/022
123/193.5

(Continued)

FOREIGN PATENT DOCUMENTS

JP       2009180172 A    8/2009
WO    WO-2015068398 A1 * 5/2015 ......... F01M 13/0416

*Primary Examiner* — Mahmoud Gimie
*Assistant Examiner* — Joshua Campbell
(74) *Attorney, Agent, or Firm* — Armstrong Teasdale LLP

(57) ABSTRACT

In an internal combustion engine, the cylinder block includes a first blowby gas passage and a first oil return passage. The cylinder head includes a second blowby gas passage connecting the first blowby gas passage with a connection passage connected with a gas-liquid separator, an oil return chamber separated from a valve operating chamber and the second blowby gas passage by first and second partition walls, respectively, and provided with a first oil return hole connected with the gas-liquid separator, and a second oil return passage connecting the valve operating chamber with the first oil return passage. The first partition wall is formed with a second oil return hole connecting the oil return chamber with the valve operating chamber. The second partition wall is formed with a ventilation hole connecting the oil return chamber with the second blowby gas passage at a higher position than the second oil return hole.

17 Claims, 7 Drawing Sheets

(51) Int. Cl.
*F01M 13/00* (2006.01)
*F02M 25/06* (2016.01)

(52) U.S. Cl.
CPC . *F01M 2013/0461* (2013.01); *F02D 2250/08* (2013.01); *F02M 25/06* (2013.01)

(56) References Cited

U.S. PATENT DOCUMENTS

| | | | | |
|---|---|---|---|---|
| 2002/0066433 | A1* | 6/2002 | Ito | F01L 1/02 123/196 R |
| 2004/0159314 | A1* | 8/2004 | Ishizuka | F01M 13/0416 123/572 |
| 2012/0199097 | A1* | 8/2012 | Sugiyama | F01M 1/04 123/196 CP |
| 2013/0133598 | A1* | 5/2013 | Yamane | F01L 1/34 123/90.17 |
| 2013/0160728 | A1* | 6/2013 | Hara | F01M 1/06 123/90.34 |
| 2013/0291816 | A1* | 11/2013 | Serrano | F01L 1/344 123/90.17 |
| 2014/0326225 | A1* | 11/2014 | Shioda | F02C 6/12 123/559.1 |
| 2015/0240732 | A1* | 8/2015 | Makihara | F02D 41/0007 60/602 |
| 2016/0265404 | A1* | 9/2016 | Fujii | F01M 13/0416 |

* cited by examiner

INTERNAL COMBUSTION ENGINE

TECHNICAL FIELD

The present invention relates to an internal combustion engine, and more particularly relates to a blowby gas passage and an oil return passage of an internal combustion engine.

BACKGROUND ART

In some internal combustion engines, a passage for allowing blowby gas to flow from the crank chamber to the valve operating chamber and a passage for allowing oil to flow from the valve operating chamber to the crank chamber are formed separately from each other in the cylinder block and the cylinder head, such that interference between the blowby gas and the oil is avoided and each of the blowby gas and the oil can flow smoothly (see JP2009-180172A, for example).

The blowby gas is supplied to a gas-liquid separator to remove liquid therefrom before being supplied to the intake system of the internal combustion engine. In the gas-liquid separator, liquid oil that has been removed from the blowby gas is produced, and therefore, a passage for returning this oil to the oil pan at a lower part of the crank chamber is necessary. Thus, such internal combustion engines need to be provided with a blowby gas passage and an oil return passage, and it is necessary to arrange them efficiently. However, it is desired to prevent contact between the blowby gas and the oil returned to the oil pan as much as possible, to minimize entrance of oil droplets into the blowby gas.

SUMMARY OF THE INVENTION

In view of such background, a primary object of the present invention is to suppress contact between blowby gas and oil in an internal combustion engine.

To achieve the above object, one aspect of the present invention provides an internal combustion engine (1), comprising: a cylinder block (2) provided with a cylinder (2D) and a crank chamber (2C); a cylinder head (4) joined to an upper end of the cylinder block in a cylinder axis direction; a head cover (5) joined to an upper end of the cylinder head in the cylinder axis direction and, in cooperation with the cylinder head, defining a valve operating chamber (18) and a connection passage (55A) that are separated from each other; and a gas-liquid separator (60) provided with a gas inlet port (61A) connected with the connection passage, a gas outlet port (61B, 61C) connected with an intake system (30) of the internal combustion engine, and an oil discharge port (61D) for discharging separated oil, wherein: the cylinder block includes a first blowby gas passage (41) and a first oil return passage (42) each extending from the crank chamber to an end surface of the cylinder block adjoining the cylinder head; the cylinder head includes a second blowby gas passage (45) extending in the cylinder axis direction to connect the first blowby gas passage with the connection passage, an oil return chamber (46) separated from the valve operating chamber by a first partition wall (47) and separated from the second blowby gas passage by a second partition wall (48), where the oil return chamber is provided with a first oil return hole (51) connected with the oil discharge port, and a second oil return passage (43) connecting the valve operating chamber with the first oil return passage; the first partition wall is formed with a second oil return hole (52) connecting the oil return chamber with the valve operating chamber; the second partition wall is formed with a ventilation hole (53) connecting the oil return chamber with the second blowby gas passage; and the ventilation hole is located at a vertically higher position than the second oil return hole.

According to this configuration, the oil discharged from the gas-liquid separator flows to the valve operating chamber via the oil return chamber, and further flows to the crank chamber via the second oil return hole and the first oil return passage. Because the valve operating chamber is connected with the second blowby gas passage via the second oil return hole, the oil return chamber, and the ventilation hole, the pressure in the valve operating chamber is substantially the same as the pressure in the crank chamber. Since the ventilation hole is located at a vertically higher position than the second oil return hole, flow of the oil in the valve operating chamber into the second blowby gas passage is prevented effectively. Therefore, contact between the blowby gas and the oil is suppressed, and entrance of the oil into the blowby gas is minimized.

In the above configuration, preferably, the second oil return hole is provided in a part of the first partition wall corresponding to a vertically lower end part of the oil return chamber.

According to this configuration, the oil is prevented from staying in the oil return chamber.

In the above configuration, preferably, the first oil return hole is located at a vertically lower position than the ventilation hole.

According to this configuration, the oil flowing into the oil return chamber from the first oil return hole is prevented from easily entering the ventilation hole.

In the above configuration, preferably, the ventilation hole is provided in a part of the second partition wall corresponding to a vertically upper end part of the oil return chamber.

According to this configuration, the oil in the oil return chamber is prevented from easily entering the ventilation hole.

In the above configuration, preferably, the second blowby gas passage is formed to have a larger cross-sectional area in an upper part thereof in the cylinder axis direction than in a lower part thereof in the cylinder axis direction.

According to this configuration, the velocity of the blowby gas decreases as the blowby gas flows through the second blowby gas passage, and this helps the oil droplets entrained in the blowby gas and floating therein to fall from the blowby gas and be removed from the same.

In the above configuration, preferably, a vertically upper part of the second blowby gas passage branches into a plurality of branch passages (45A, 45B) such that one of the branch passages (45A) is connected with the connection passage and another one of the branch passages (45B) is connected with the ventilation hole.

According to this configuration, the oil in the oil return chamber is prevented from easily flowing to the second blowby gas passage through the ventilation hole. Further, even if the oil in the oil return chamber flows to the second blowby gas passage through the ventilation hole, flow of the oil to the connection passage is suppressed.

In the above configuration, preferably, the cylinder head has a bearing wall (21) rotatably supporting a camshaft (19), and an upper part of the second blowby gas passage in the cylinder axis direction is formed in the bearing wall.

According to this configuration, the second blowby gas passage is formed by use of the bearing wall, and therefore, the cylinder head can be made compact in size.

In the above configuration, preferably, the bearing wall serves as an end wall (12) constituting an end part of the cylinder head in a crankshaft direction.

According to this configuration, because the second blowby gas passage is formed in the end wall, the cylinder head can be made compact in size.

In the above configuration, preferably, an upper part of the oil return chamber in the cylinder axis direction is formed in the bearing wall.

According to this configuration, because the oil return chamber is formed by use of the bearing wall, the cylinder head can be made compact in size.

In the above configuration, preferably, the second partition wall has a part (48A) extending relative to a vertical direction to overhang the oil return chamber.

According to this configuration, the oil in the oil return chamber is effectively prevented from reaching the ventilation hole.

In the above configuration, preferably, the first partition wall extends in a direction perpendicular to a crankshaft direction to separate the second blowby gas passage and the oil return chamber from the valve operating chamber.

According to this configuration, the second blowby gas passage and the oil return chamber are collectively located on a side of the valve operating chamber via the first partition wall, and thus, the cylinder head can be made compact in size.

In the above configuration, preferably, two camshafts (19) are supported in the cylinder head, and the second partition wall has a part (48A) extending toward a center of one of the camshafts.

According to this configuration, the second partition wall improves the stiffness of the cylinder head against the load applied to the cylinder head from a chain or belt wound around the camshafts via the one of the camshafts.

In the above configuration, preferably, two camshafts (19) are supported in the cylinder head; a winding transmission body (19B) is wound around rotating bodies (19A) provided to respective end parts of the camshafts as well as a rotating body provided to an end part of a crankshaft; and the second partition wall has a part extending in parallel with a bisector of an angle defined between imaginary straight lines extrapolating two parts of the winding transmission body that extend in two different directions from the rotating body of one of the camshafts.

According to this configuration, the second partition wall improves the stiffness of the cylinder head against the load applied to the cylinder head from the chain or belt wound around the camshafts via the one of the camshafts.

In the above configuration, preferably, the second blowby gas passage and the oil return chamber are located adjacent to a downstream end part of a cooling water passage (57) formed in the cylinder head.

According to this configuration, the oil passing through oil return chamber is heated as a result of heat exchange with the cooling water passing through the downstream end part of the cooling water passage. In addition, the temperature of the wall surface defining the second blowby gas passage is maintained at a relatively high temperature owing to the heat exchange with the cooling water passing through the downstream end part of the cooling water passage, and this suppresses condensation and freezing of the water contained in the blowby gas passing through the second blowby gas passage.

In the above configuration, preferably, the cooling water passage is provided below the oil return chamber and lateral to the second blowby gas passage.

According to this configuration, the cooling water passage, the oil return chamber, and the second blowby gas passage are efficiently arranged in an end part of the cylinder head.

In the above configuration, preferably, the internal combustion engine consists of a V-type internal combustion engine including two cylinder banks offset from each other in a crankshaft direction; the cylinder head is included in one of the cylinder banks as a first cylinder head and an additional cylinder head having an identical shape as that of the first cylinder head is included in the other of the cylinder banks as a second cylinder head, the first and second cylinder heads being positioned to be reversed relative to each other in the crankshaft direction; and the oil return chambers in the first and second cylinder heads are formed in mutually facing side parts of the first and second cylinder heads.

According to this configuration, the oil return chamber is positioned on an upper side of each inclined cylinder head, and this prevents reverse flow of the oil from the valve operating chamber to the oil return chamber. Further, because the two cylinder banks are constituted by the cylinder heads having an identical shape, the manufacturing cost can be reduced.

In the above configuration, preferably, the gas-liquid separator is located between the first and second cylinder heads.

According to this configuration, because the gas-liquid separator is located in a recess defined between the two cylinder banks, the internal combustion engine as a whole can be made compact in size.

According to the above-described configuration, contact between blowby gas and oil is suppressed in an internal combustion engine.

DETAILED DESCRIPTION OF THE PREFERRED EMBODIMENTS

In the following, embodiments of an internal combustion engine according to the present invention will be described with reference to the drawings.

(General Configuration of Internal Combustion Engine)

Figure 1:
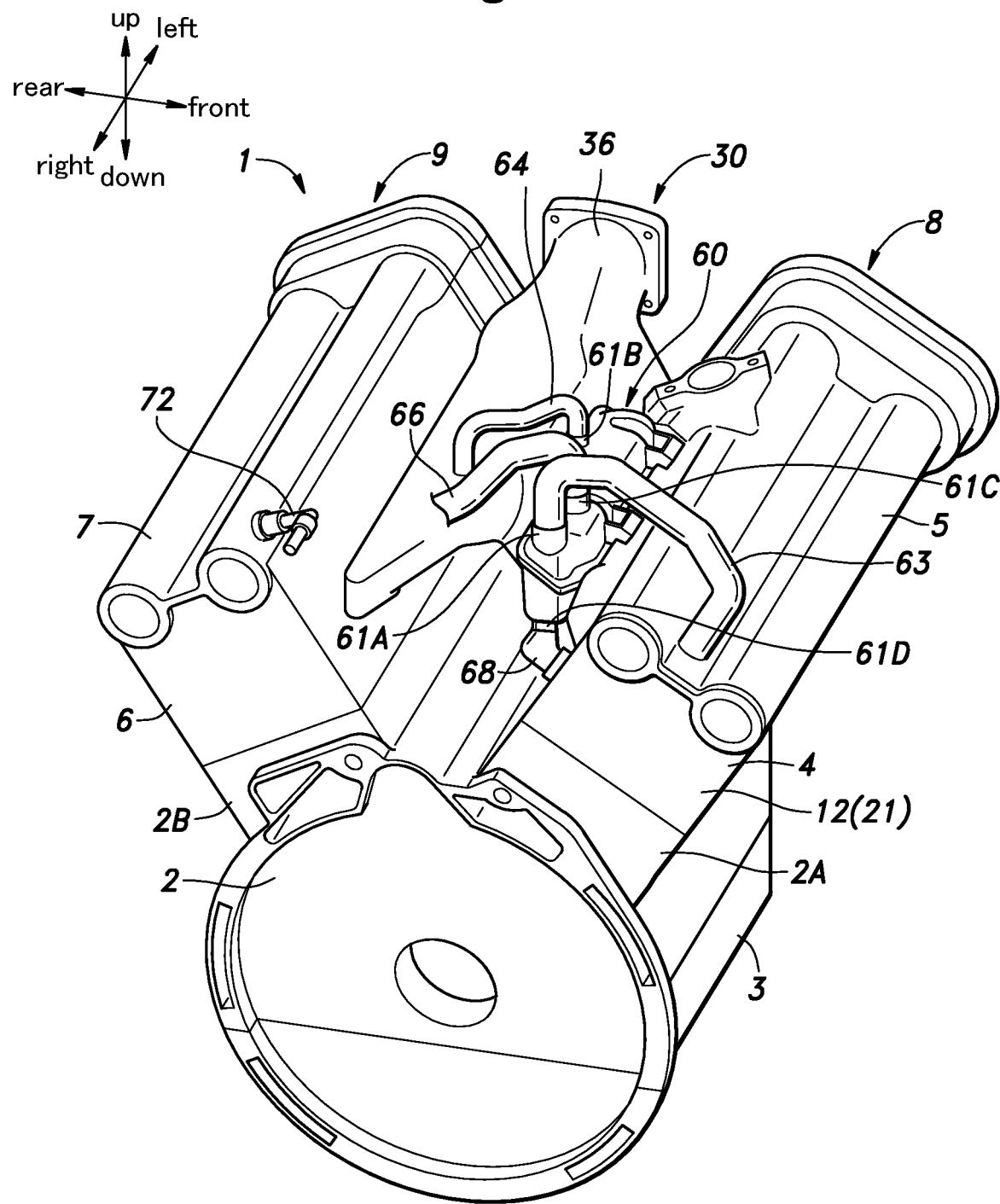
FIG. 1 is a perspective view of an internal combustion engine according to an embodiment of the present invention.
Figure 2:
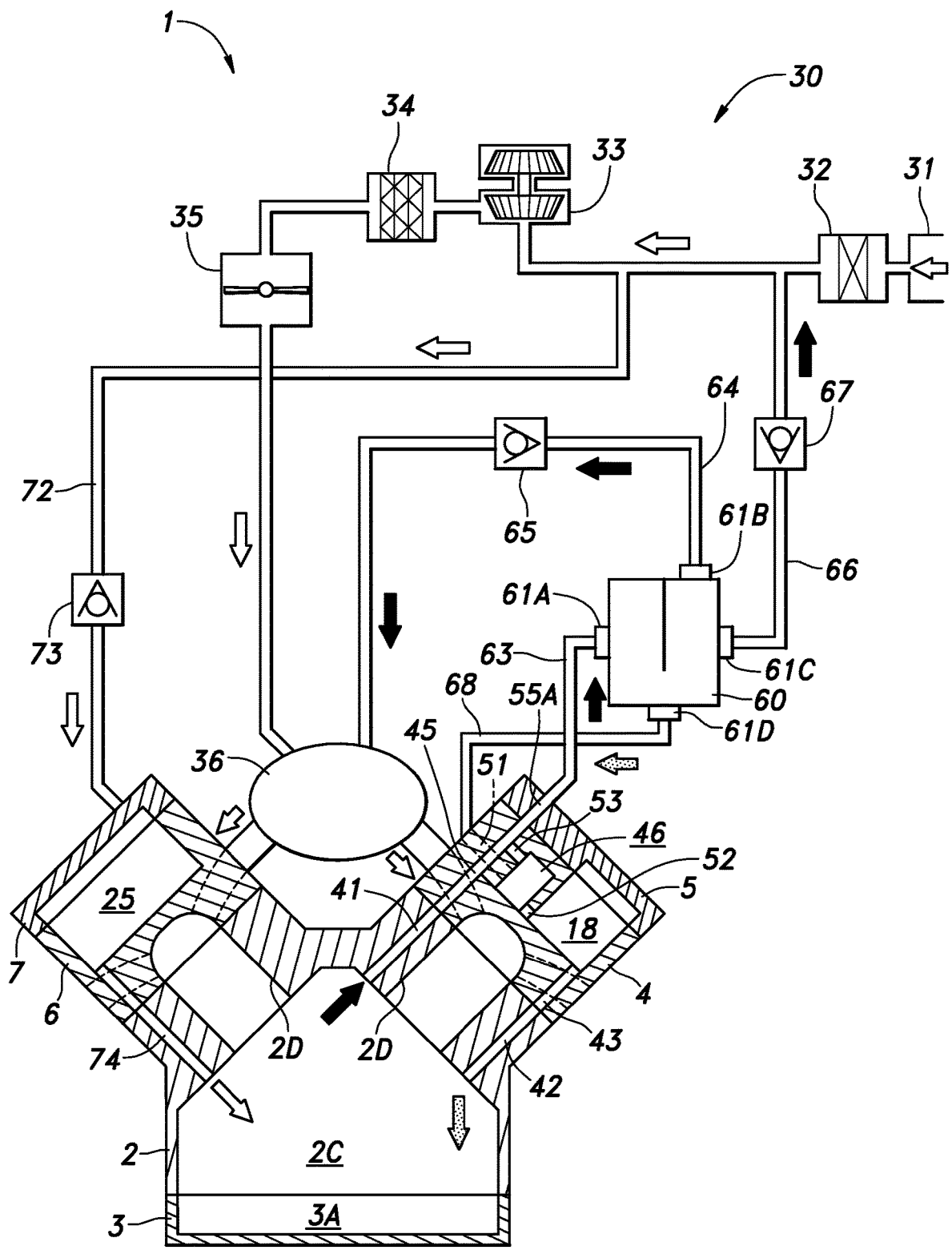
FIG. 2 is a configuration diagram of the internal combustion engine.

As shown in FIGS. 1 and 2, an internal combustion engine 1 of the present embodiment consists of a V-type 6-cylinder engine. The internal combustion engine 1 is disposed on the vehicle body such that the crankshaft extends in a left-and-right or transverse direction. The internal combustion engine 1 includes: a cylinder block 2*a* containing a front cylinder part 2A provided on an upper front side and a rear cylinder part 2B provided on an upper rear side; an oil pan 3 joined to a lower part of the cylinder block 2; a front cylinder head 4 joined to the front cylinder part 2A of the cylinder block 2; a front head cover (front cam cover) 5 joined to an upper part of the front cylinder head 4; a rear cylinder head 6 joined to the rear cylinder part 2B of the cylinder block 2; and a rear head cover (rear cam cover) 7 joined to an upper part of the rear cylinder head 6. The front cylinder part 2A of the cylinder block 2, the front cylinder head 4, and the front head cover 5 in cooperation constitute a front bank 8, while the rear cylinder part 2B of the cylinder block 2, the rear cylinder head 6, and the rear head cover 7 in cooperation constitute a rear bank 9.

A lower part of the cylinder block 2 constitutes a crankcase that opens downward and defines a crank chamber 2C accommodating the crankshaft therein. Each of the front cylinder part 2A and the rear cylinder part 2B extends transversely and defines three cylinders 2D arranged in the transverse direction. Each cylinder 2D is connected with the crank chamber 2C. An axis A (see FIG. 4) of each cylinder 2D of the front cylinder part 2A tilts forward about the crankshaft by a prescribed angle relative to the vertical direction (vertical plane). An axis of each cylinder 2D of the rear cylinder part 2B tilts rearward about the crankshaft by a prescribed angle relative to the vertical plane. An upper end surface of each of the front cylinder part 2A and the rear cylinder part 2B constitutes a fastening surface for a cylinder head, and the cylinders 2D open out in the upper end surface. In each cylinder 2D is received a piston that is coupled with the crankshaft by a corresponding connecting rod and can reciprocate in the cylinder 2D. A lower part of the crank chamber 2C is closed by the oil pan 3. An interior of the oil pan 3 constitutes an oil reservoir 3A connected with the crank chamber 2C. A transmission is joined to the right end surface of the cylinder block 2.

As shown in FIGS. 3 to 6, the front cylinder head 4 includes a head lower part 4A fastened to the upper end surface of the front cylinder part 2A and a head upper part 4B provided in an upper part of the head lower part 4A. The head upper part 4B includes a pair of front and rear side walls 11, 11 projecting upward from front and rear edges of an upper end part of the head lower part 4A, respectively, and extending transversely, and a pair of left and right end walls 12, 12 projecting upward from left and right edges of the upper end part of the head lower part 4A, respectively, and extending in the front-and-rear direction. The pair of side walls 11, 11, the pair of end walls 12, 12, and an upper surface 13 of the head lower part 4A in cooperation forms a substantially rectangular parallelepiped box-like shape that is elongated transversely and opens upward.

Figure 3:
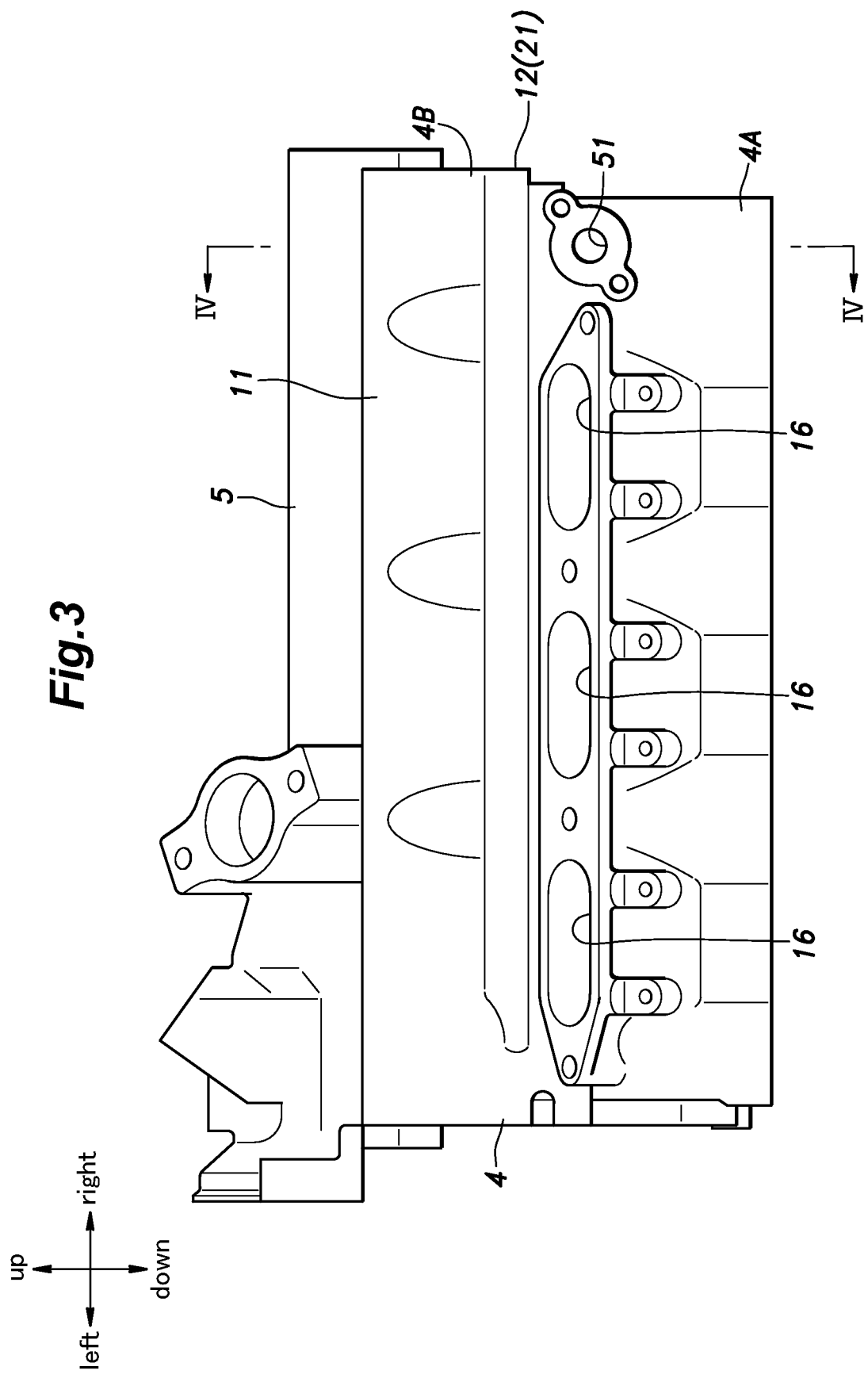
FIG. 3 is a rear side view showing an intake-side of a cylinder head of the internal combustion engine.
Figure 5:
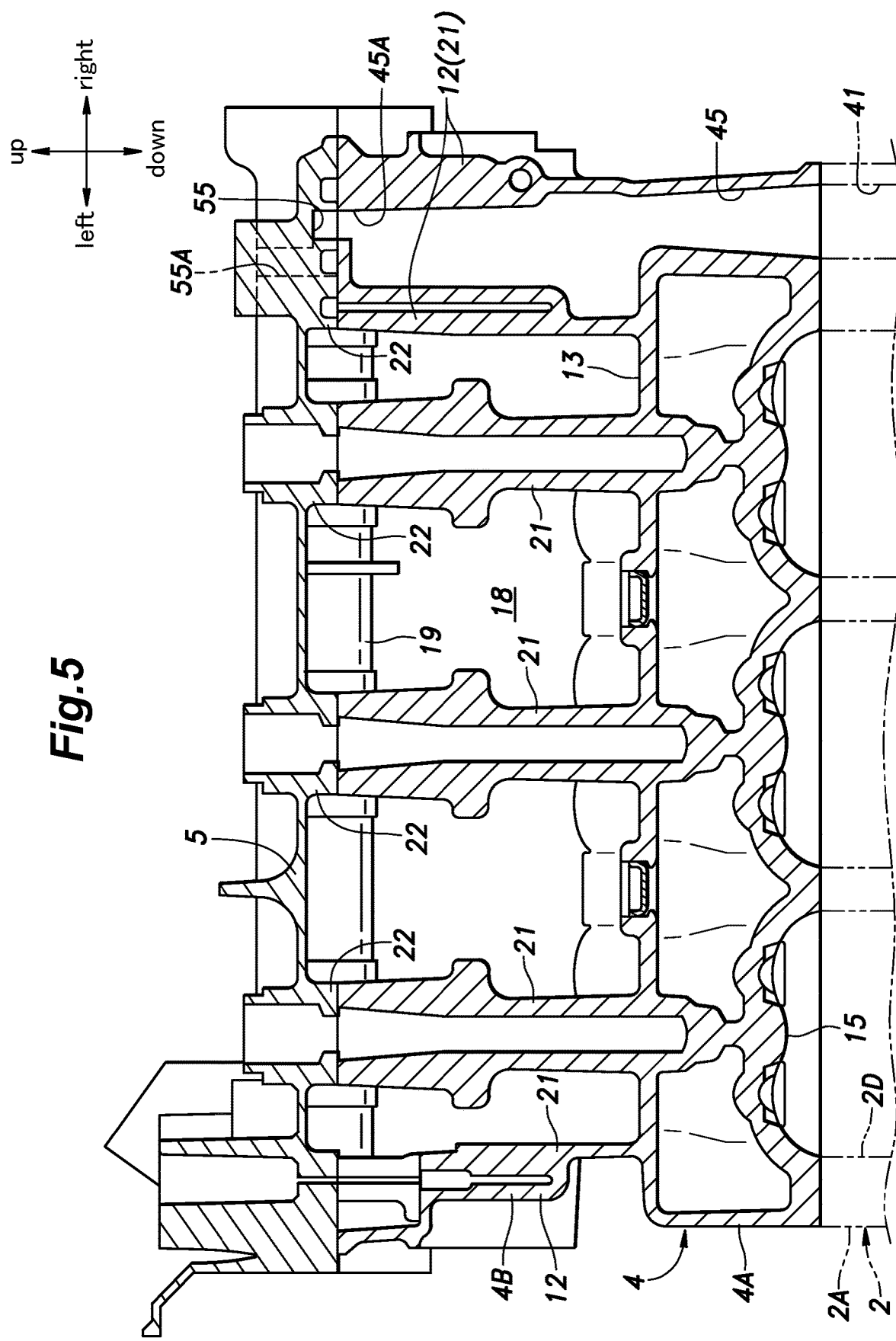
FIG. 5 is a cross-sectional view taken along line V-V in FIG. 4.

As shown in FIG. 5, a lower end surface of the head lower part 4A is formed with a plurality of substantially semi-spherical combustion chamber ceilings 15 which are recessed corresponding to the respective cylinders 2D. As shown in FIG. 3, the front cylinder head 4 has a plurality of intake ports 16 each extending rearward from the corresponding combustion chamber ceiling 15 and opening out in the rear side surface of the front cylinder head 4. Further, the front cylinder head 4 has a plurality of exhaust ports each extending forward from the corresponding combustion chamber ceiling 15 and opening out in the front side surface of the front cylinder head 4.

Figure 4:
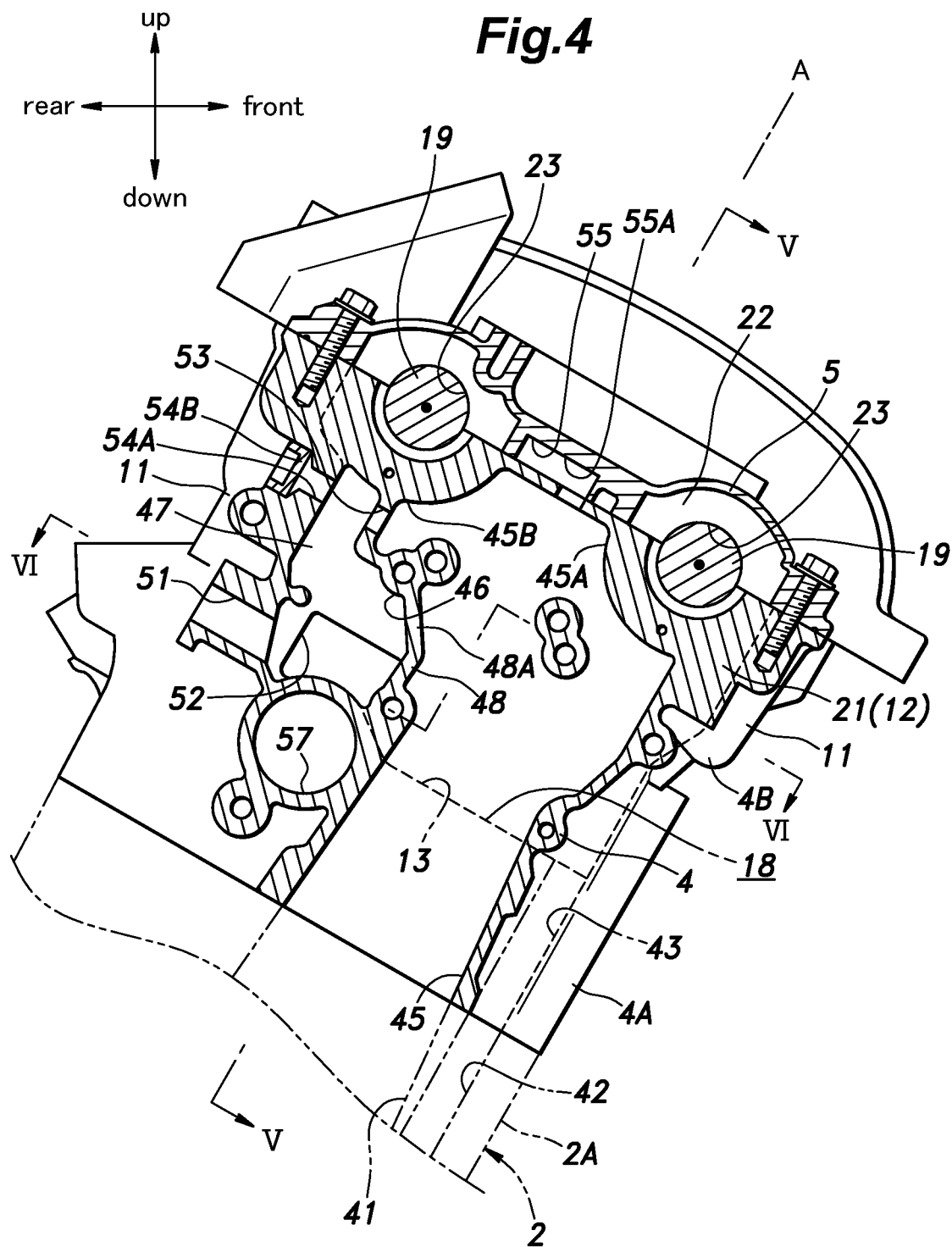
FIG. 4 is a cross-sectional view taken along line IV-IV in FIG. 3.

As shown in FIGS. 4 and 5, the front head cover 5 is provided to cover the upper part of the front cylinder head 4. Specifically, a peripheral edge part of the front head cover 5 is joined to upper end surfaces of the pair of side walls 11, 11 and the pair of end walls 12, 12. The front head cover 5 and the head upper part 4B in cooperation define a front valve operating chamber 18. In the front valve operating chamber 18 is provided a valve operating mechanism for opening and closing the valves provided in the intake ports 16 and the exhaust ports. The valve operating mechanism is of DOHC type and includes two camshafts 19. The valve operating mechanism preferably includes, in addition to the camshafts 19, rocker arms driven by the camshafts 19 to push the valves at predetermined timings.

Figure 7:
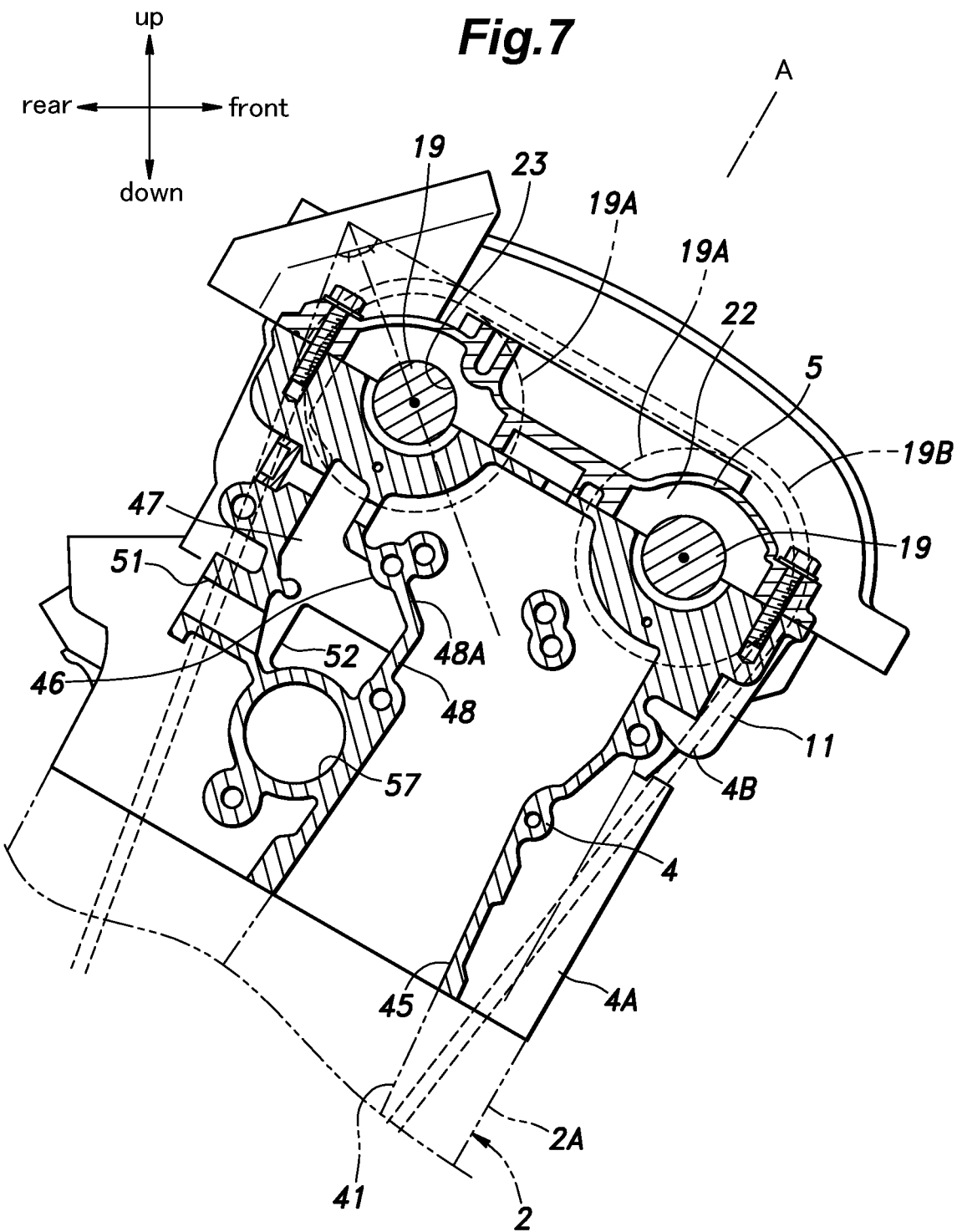
FIG. 7 is an explanatory diagram showing a positional relationship between the cylinder head and a chain.

The two camshafts 19 are disposed in parallel with the crankshaft, and are coupled with the crankshaft by a transmission mechanism including a rotating body 19A constituted of a sprocket or a pulley, a winding transmission body 19B constituted of a chain or a belt, and a rotating body (sprocket or pulley) provided to the crankshaft (see FIG. 7). As shown in FIG. 5, a plurality of bearing walls 21 are formed to project from the upper surface 13 of the head lower part 4A of the front cylinder head 4, and a plurality of bearing caps 22 are formed to project from the lower surface of the front head cover 5 in correspondence with the bearing walls 21. Each bearing wall 21 and its corresponding bearing cap 22 are fastened to each other to jointly form therebetween a bearing 23 for rotatably supporting the associated camshaft 19. The left and right end walls 12, 12 serve as the bearing walls 21 supporting the left and right ends of each camshaft 19.

As shown in FIG. 2, the rear cylinder head 6 has a structure substantially front-back symmetrical to that of the front cylinder head 4, and has a plurality of combustion chamber ceilings 15, a plurality of intake ports 16 extending from the respective combustion chamber ceilings 15 to the front surface of the rear cylinder head 6, and a plurality of exhaust ports extending from the respective combustion chamber ceilings 15 to the rear surface of the rear cylinder head 6. Further, similarly to the front cylinder head 4, an upper part of the rear cylinder head 6 is covered by the rear head cover 7 such that a rear valve operating chamber 25, in which a valve operating mechanism is provided, is defined between the rear cylinder head 6 and the rear head cover 7.

An intake system 30 of the internal combustion engine 1 includes, from upstream to downstream, an intake inlet 31, an air cleaner 32, a compressor 33 of a turbocharger, an intercooler 34, a throttle valve 35, and an intake manifold 36. As shown in FIG. 1, the intake manifold 36 is disposed between the front cylinder head 4 and the rear cylinder head 6, and is connected to the intake ports 16 of the front cylinder head 4 and the rear cylinder head 6. An exhaust system (not shown in the drawings) of the internal combustion engine 1 includes, from upstream to downstream, an exhaust manifold connected with the exhaust ports of the front cylinder head 4 and the rear cylinder head 6, a turbine of the turbocharger, a catalytic converter, a silencer, and an exhaust outlet. The internal combustion engine 1 includes an oil pump for force feeding oil in the oil reservoir 3A to slide contact parts including the valve operating mechanisms of the internal combustion engine 1. The oil pump consists of a per se known trochoid pump or the like and is driven by the rotational force of the crankshaft to force feed the oil.
(Blowby Gas Passage and Oil Return Passage)

As shown in FIGS. 2 and 4, the front cylinder part 2A of the cylinder block 2 is formed with a first blowby gas passage 41 and a plurality of first front oil return passages 42 such that each of the first blowby gas passage 41 and the first front oil return passages 42 extends in the cylinder axis direction and has a lower end connected with the crank chamber 2C and an upper end opening out in the upper end surface of the front cylinder part 2A. The first blowby gas passage 41 is formed in one end part of the front cylinder part 2A in the crankshaft direction or cylinder row direction (in the present embodiment, in the right end part). In the present embodiment, the first front oil return passages 42 are formed in the front end part of the front cylinder part 2A; specifically, the first front oil return passages 42 are located in front of the axis A of each cylinder 2D. Also, each first front oil return passage 42 is preferably located between adjoining ones of the cylinders 2D.

Figure 6:
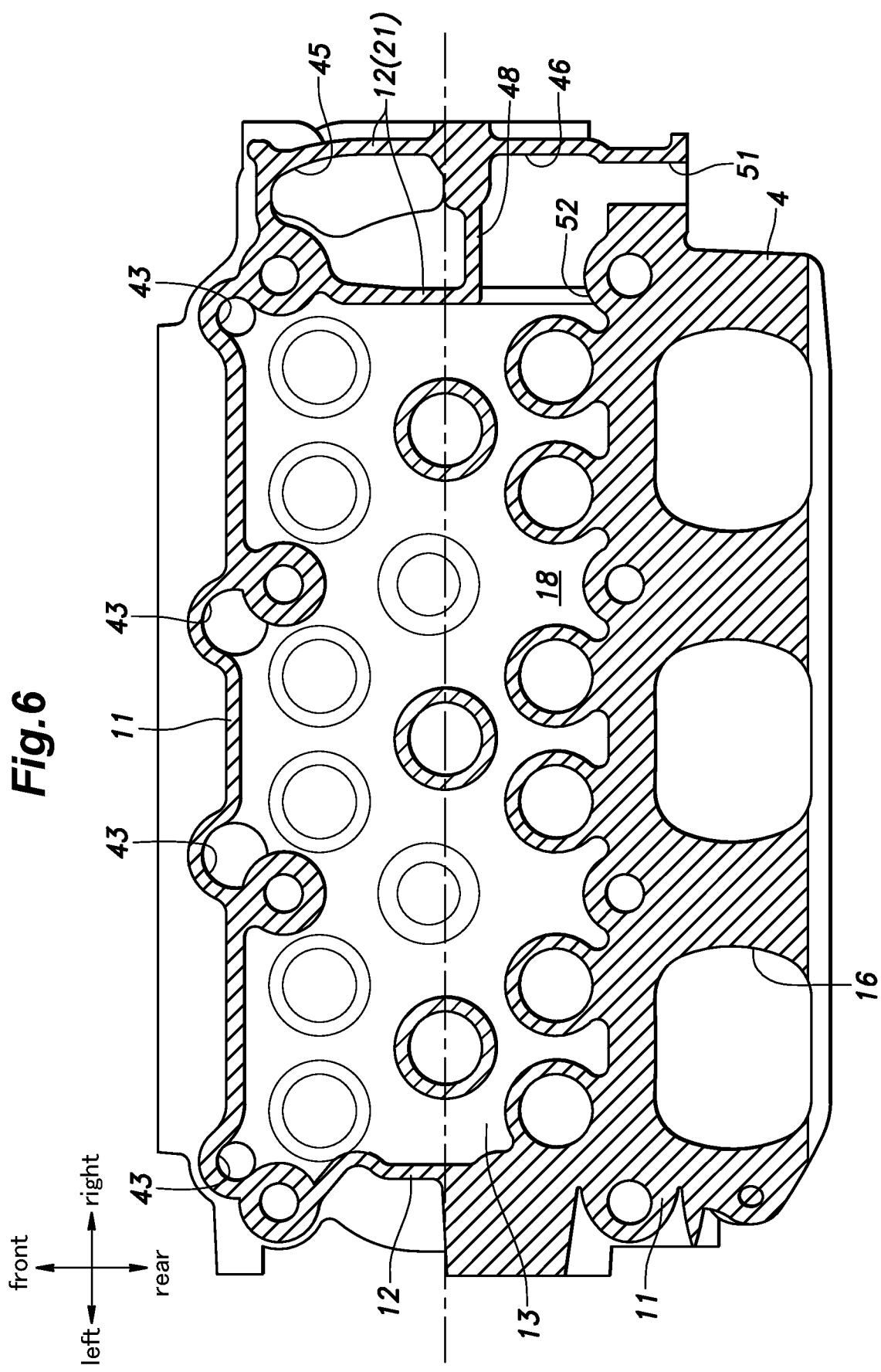
FIG. 6 is a cross-sectional view taken along line VI-VI in FIG. 4.

As shown in FIGS. 2, 4, and 6, the front cylinder head 4 is formed with a plurality of second front oil return passages 43 such that each second front oil return passage 43 extends in the cylinder axis direction and connects a bottom part of the front valve operating chamber 18 (the upper surface 13 of the head lower part 4A) with a corresponding one of the first front oil return passages 42. The second front oil return passages 43 are provided in a front end part of the head lower part 4A of the front cylinder head 4. As the front cylinder head 4 tilts forward, the bottom surface of the front valve operating chamber 18 also tilts forward. The second front oil return passages 43 open out at the vertically lowermost position in the front valve operating chamber 18.

As shown in FIGS. 4 and 5, the front cylinder head 4 is formed with a second blowby gas passage 45 that extends in the cylinder axis direction and having a lower end connected with the first blowby gas passage 41 and an upper end opening out in the upper end surface of the right end wall 12 (bearing wall 21). As shown in FIGS. 5 and 6, the second blowby gas passage 45 is formed in one end part of the head lower part 4A of the front cylinder head 4 in the cylinder row direction. Specifically, the second blowby gas passage 45 is formed between one end surface of the head lower part 4A of the front cylinder head 4 in the cylinder row direction and one of the combustion chamber ceilings 15 that is the closest to the one end surface. The second blowby gas passage 45 further extends upward from the head lower part 4A to pass through one of the bearing walls 21 until it reaches the upper end surface of the bearing wall 21. In the present embodiment, an upper part of the second blowby gas passage 45 is formed in the right end wall 12 serving as the bearing wall 21. As shown in FIGS. 4 and 5, the second blowby gas passage 45 is formed such that its upper part has a larger front-rear width and a larger left-right width than its lower part. Namely, the second blowby gas passage 45 is formed to have a larger cross-sectional area (flow cross-sectional area) in the lower part thereof than in the upper part thereof. An upper end part of the second blowby gas passage 45 includes a front branch part 45A extending frontward and upward and opening out in the upper end surface of the right end wall 12 and a rear branch part 45B extending rearward.

As shown in FIG. 4, an oil return chamber 46 is formed in the right end wall 12 at a position behind the second blowby gas passage 45. The oil return chamber 46 is separated from the front valve operating chamber 18 by a first partition wall 47 constituting a side part of the right end wall 12 adjoining the front valve operating chamber 18. Namely, the oil return chamber 46 is located to the right of the front valve operating chamber 18 via the first partition wall 47 whose principal surface faces in the cylinder row direction (transverse direction in the present embodiment). Similarly, the second blowby gas passage 45 is located to the right of the front valve operating chamber 18 via the first partition wall 47 whose principal surface faces in the cylinder row direction. The first partition wall 47 extends in a direction perpendicular to the cylinder row direction to separate the second blowby gas passage 45 and the oil return chamber 46 from the front valve operating chamber 18.

The second blowby gas passage 45 and the oil return chamber 46 are separated from each other by a second partition wall 48 extending substantially vertically. An upper part 48A of the second partition wall 48 is bent rearward along a rear edge of the rear branch part 45B of the second blowby gas passage 45. Namely, the upper part 48A of the second partition wall 48 extends over the oil return chamber 46 or overhangs the oil return chamber 46. The upper part 48A of the second partition wall 48 extends toward a center of one of the camshafts 19. As shown in FIG. 7, preferably, the upper part 48A of the second partition wall 48 extends substantially in parallel with a bisector of an imaginary angle defined between straight imaginary lines extrapolating (or extending in line with) two parts of the winding transmission body 19B that extend in two tangential directions from the rotating body 19A of the one of the camshafts 19. More preferably, the upper part 48A of the second partition wall 48 extends in line with the bisector of the imaginary angle.

As shown in FIGS. 3 and 4, a lower part of the oil return chamber 46 is formed with a first oil return hole 51 extending rearward and opening out in a rear surface of the head lower part 4A of the front cylinder head 4. An outer end (rear end) of the first oil return hole 51 is connected with an oil discharge port 61D of a gas-liquid separator 60, which will be described later, via a piping or the like. A lower part of the first partition wall 47 is formed with a second oil return hole 52 that extends through the first partition wall 47 in the thickness direction thereof (left and right direction) to connect the oil return chamber 46 with the front valve operating chamber 18. An upper end part of the second partition wall 48 is formed with a ventilation hole 53 that extends through the second partition wall 48 in the thickness direction thereof (front and rear direction) to connect the oil return chamber 46 with the second blowby gas passage 45. When forming the ventilation hole 53, a drill may be used to form the ventilation hole 53 from the rear side of the front cylinder head 4 together with a hole 54A in the rear side wall 11, and then, the hole 54A formed in the rear side wall 11 is closed by a plug 54B.

As shown in FIG. 4, the second oil return hole 52 is formed in a part of the first partition wall 47 corresponding to a vertically lower end part of the oil return chamber 46. The second oil return hole 52 is preferably formed in a rear part of the front cylinder head 4 and opens out in a rear part of the front valve operating chamber 18. The ventilation hole 53 is located at a vertically higher position than the first oil return hole 51 and the second oil return hole 52. The first oil return hole 51 is located at a vertically higher position than the second oil return hole 52. The ventilation hole 53 has an axis extending substantially in the front-rear direction, and the second oil return hole 52 has an axis extending substantially in the left-right direction. As a result, the axis of the ventilation hole 53 and the axis of the second oil return hole 52 extend substantially perpendicular to each other.

At a position below the oil return chamber 46 and lateral to the second blowby gas passage 45 is located a downstream end part of a cooling water passage 57. The cooling water passage 57 is formed to extend near or around the combustion chamber ceilings 15 of the front cylinder head 4 and the exhaust ports extending from the respective combustion chamber ceilings 15, and thus, the cooling water in the downstream end part of the cooling water passage 57 has a relatively high temperature as a result of heat exchange between the cooling water and the high temperature portions of the front cylinder head 4. The downstream end part of the cooling water passage 57 is preferably located near the oil return chamber 46 and the second blowby gas passage 45 such that it can exchange heat with the walls defining the oil return chamber 46 and the second blowby gas passage 45. The downstream end part of the cooling water passage 57 may open out in an end part of the front cylinder head 4 at the time of manufacture. For instance, the downstream end part of the cooling water passage 57 may be a part where a support piece of a casting core for forming the cooling water passage 57 is disposed when forming the front cylinder head 4 by casting. In the case where the downstream end part of the cooling water passage 57 opens out in the end part of the front cylinder head 4 at the end of the casting, the opening end of the downstream end part of the cooling water passage 57 should be closed by a plug, for example, in a later manufacturing process.

As shown in FIGS. 4 and 5, the fastening surface of the rightmost bearing cap 22 of the front head cover 5 is provided with a passage groove 55 that is recessed upward. The passage groove 55 and the upper end surface of the right end wall 12 in cooperation define a connection passage 55A. The connection passage 55A is separated from the front valve operating chamber 18. An open end of the second blowby gas passage 45 in the upper end surface of the right end wall 12 is connected with the connection passage 55A. The passage groove 55 extends through the front head cover 5 in the thickness direction (up-down direction) at one end thereof and opens out in the upper surface of the front head cover 5.

As shown in FIGS. 1 and 2, the open end of the connection passage 55A in the upper surface of the front head cover 5 is connected with the gas-liquid separator 60. The gas-liquid separator 60 may be any per se known gas-liquid separator such as a cyclone gas-liquid separator that separates gas and liquid by centrifugal force or an inertial gas-liquid separator that includes a serpentine passage formed by a plurality of baffle plates and separates gas and liquid by use of inertial force. The gas-liquid separator 60 includes a gas inlet port 61A, a first gas outlet port 61B, a second gas outlet port 61C, and an oil discharge port 61D. In the gas-liquid separator 60, the blowby gas flows from the gas inlet port 61A to the first gas outlet port 61B or the second gas outlet port 61C, and the oil separated from the blowby gas is discharged from the oil discharge port 61D. The gas-liquid separator 60 is located behind the rear side wall 11 of the front cylinder head 4. The gas-liquid separator 60 is located between the front cylinder head 4 and the rear cylinder head 6.

The open end of the connection passage 55A in the upper surface of the front head cover 5 is connected with the gas inlet port 61A of the gas-liquid separator 60 via a first connecting pipe 63. The first gas outlet port 61B is connected with the intake manifold 36 via a second connecting pipe 64. The second connecting pipe 64 is provided with a first check valve (PCV valve) 65 that permits the gas flow from the first gas outlet port 61B to the intake manifold 36 while prohibiting the gas flow in the opposite direction. The first check valve 65 is configured to open when the pressure on the side of the first gas outlet port 61B becomes higher than the pressure on the side of the intake manifold 36 by a predetermined value or larger. The second gas outlet port 61C is connected via a third connecting pipe 66 with a part of the intake system 30 between the air cleaner 32 and the compressor 33. The third connecting pipe 66 is provided with a second check valve 67 that permits the gas flow from the second gas outlet port 61C to the intake system 30 while prohibiting the gas flow in the opposite direction. The oil discharge port 61D is connected with the first oil return hole 51 via a fourth connecting pipe 68.

As shown in FIG. 2, the rear valve operating chamber 25 defined between the rear cylinder head 6 and the rear head cover 7 is connected via a fifth connecting pipe 72 with a part of the intake system 30 between the air cleaner 32 and the compressor 33. The fifth connecting pipe 72 is provided with a third check valve 73 that permits the gas flow from the intake system 30 to the rear valve operating chamber 25 while prohibiting the gas flow in the opposite direction. The rear valve operating chamber 25 is connected with the crank chamber 2C by a rear oil return passage 74 formed in the rear cylinder head 6 and the rear cylinder part 2B of the cylinder block 2.

The front cylinder head 4 constituting the front bank 8 and the rear cylinder head 6 constituting the rear bank 9 are formed to have an identical shape and are positioned such that they are reversed in the cylinder row direction (crankshaft direction) relative to each other. The front cylinder head 4 and the rear cylinder head 6 are disposed to be offset from each other along the crankshaft in such a direction that their end parts in which the oil return chamber 46 and the second blowby gas passage 45 are formed come away from each other. The oil return chambers 46 are formed in the mutually facing side parts of the front cylinder head 4 and the rear cylinder head 6.

In the above-described configuration, as shown in FIG. 2, the blowby gas in the crank chamber 2C passes through the first blowby gas passage 41, the second blowby gas passage 45, and the connection passage 55A in order, and flows into the gas-liquid separator 60. Then, the blowby gas is supplied from the first gas outlet port 61B to the intake manifold 36 during natural aspiration, and from the second gas outlet port 61C to the part of the intake system 30 between the air cleaner 32 and the compressor 33 during supercharging.

The oil separated from the blowby gas at the gas-liquid separator 60 passes through the oil discharge port 61D, the first oil return hole 51, the oil return chamber 46, and the second oil return hole 52 in order, and flows into the front valve operating chamber 18. The oil in the front valve operating chamber 18 flows through the second front oil return passages 43 and the first front oil return passages 42 into the oil reservoir 3A defined in the lower part of the crank chamber 2C.

Fresh air flows from the part of the intake system 30 between the air cleaner 32 and the compressor 33 to the front valve operating chamber 18 after passing through the fifth connecting pipe 72, the rear valve operating chamber 25, the rear oil return passage 74, the crank chamber 2C, the first blowby gas passage 41, the second blowby gas passage 45, the ventilation hole 53, the oil return chamber 46, and the second oil return hole 52 in order.

The oil discharged from the gas-liquid separator 60 flows to the front valve operating chamber 18 via the oil return chamber 46, and then, passes through the second front oil return passages 43 and the first front oil return passages 42 into the crank chamber 2C. Because the front valve operating chamber 18 is connected with the second blowby gas passage 45 via the second oil return hole 52, the oil return chamber 46, and the ventilation hole 53, the pressure in the front valve operating chamber 18 becomes substantially the same as that in the crank chamber 2C.

In the above-described embodiment, since the ventilation hole 53 is located at a vertically higher position than the second front oil return passages 43, flow of the oil in the front valve operating chamber 18 to the second blowby gas passage 45 is suppressed. Therefore, contact between the blowby gas and the oil is suppressed and entrance of the oil into the blowby gas is minimized. Further, because the second oil return hole 52 is formed in the part of the first partition wall 47 corresponding to the vertically lower end part of the oil return chamber 46, the oil is prevented from staying in the oil return chamber 46. In addition, because the ventilation hole 53 is located at a vertically higher position than the first oil return hole 51, the oil flowing into the oil return chamber 46 from the first oil return hole 51 is prevented from easily entering the ventilation hole 53. Yet further, because the ventilation hole 53 is located in a part corresponding to the vertically upper end part of the oil return chamber 46, the oil in the oil return chamber 46 is prevented from easily entering the ventilation hole 53. Furthermore, because the second partition wall 48 includes the upper part 48A extending relative to the vertical direction to overhang the oil return chamber 46, the oil in the oil return chamber 46 is even more effectively prevented from reaching the ventilation hole 53.

The second blowby gas passage 45 is formed to have a larger cross-sectional area in the upper part thereof in the cylinder axis direction than in the lower part thereof in the cylinder axis direction, and therefore, the velocity of the blowby gas decreases as the blowby gas flows through the second blowby gas passage 45. This helps the oil droplets entrained in the blowby gas and floating therein to fall from the blowby gas and be removed from the same.

The upper part of the second blowby gas passage 45 branches into the front branch part 45A and the rear branch part 45B such that the front branch part 45A is connected with the connection passage 55A and the rear branch part 45B is connected with the ventilation hole 53, and therefore, the oil in the oil return chamber 46 is even more effectively prevented from flowing into the second blowby gas passage 45 through the ventilation hole 53.

Also, because the upper part of the second blowby gas passage 45 and the oil return chamber 46 are formed in the right end wall 12 constituting the bearing wall 21, the cylinder head can be made compact in size.

Further, because the upper part 48A of the second partition wall 48 extends toward the center of one of the camshafts 19, the stiffness of the front cylinder head 4 against the load applied to the front cylinder head 4 from the winding transmission body 19B via the one of the camshafts 19 is improved. In addition, because the upper part 48A of the second partition wall 48 extends substantially in parallel with the bisector of the imaginary angle defined between straight imaginary lines extrapolating the two parts of the winding transmission body 19B that extend in two tangential directions of the rotating body 19A of one of the camshafts 19, the stiffness of the front cylinder head 4 is improved.

The oil return chamber 46 is located adjacent to the downstream end part of the cooling water passage 57, and therefore, the oil passing through the oil return chamber 46 is heated as a result of heat exchange with the high-temperature cooling water passing through the downstream end part of the cooling water passage 57. In addition, because the second blowby gas passage 45 is located adjacent to the downstream end part of the cooling water passage 57, the temperature of the wall surface defining the second blowby gas passage 45 is maintained at a relatively high temperature owing to the heat exchange with the cooling water passing through the downstream end part of the cooling water passage 57, and this suppresses condensation and freezing of the water contained in the blowby gas passing through the second blowby gas passage 45. Further, by providing the cooling water passage 57 below the oil return chamber 46 and lateral to the second blowby gas passage 45, the cooling water passage 57, the oil return chamber 46, and the second blowby gas passage 45 can be efficiently arranged in the end part of the front cylinder head 4.

Further, in the above embodiment, the oil return chamber 46 is positioned on an upper side of the inclined front cylinder head 4. Therefore, reverse flow of the oil from the front valve operating chamber 18 to the oil return chamber 46 is prevented. Because the front cylinder head 4 and the rear cylinder head 6 are formed to have an identical shape, the manufacturing cost can be reduced. Further, because the gas-liquid separator 60 is located in a recess defined between the front cylinder head 4 and the rear cylinder head 6, the internal combustion engine as a whole can be made compact in size.

In the foregoing, the concrete embodiments of the present invention have been described, but the present invention is not limited to the foregoing embodiments and various modifications and alterations are possible. For example, in the above embodiment, the front cylinder head 4 and the rear cylinder head 6 have an identical shape, and the second blowby gas passage 45, the oil return chamber 46, etc. are provided in each of the front cylinder head 4 and the rear cylinder head 6. However, the second blowby gas passage 45, the oil return chamber 46, etc. may be provided in only one of the front cylinder head 4 and the rear cylinder head 6. Also, in the foregoing embodiment, the internal combustion engine 1 was disposed such that the crankshaft extends in the transverse direction and the two cylinder banks are disposed one behind the other. However, it is also possible to dispose the internal combustion engine 1 such that the crankshaft extends in the fore-and-aft or longitudinal direction of the vehicle, and in this case, the second blowby gas passage 45, the oil return chamber 46, etc. are provided in the left and/or right cylinder heads.

The invention claimed is:

1. An internal combustion engine, comprising:
   a cylinder block provided with a cylinder and a crank chamber;
   a cylinder head joined to an upper end of the cylinder block in a cylinder axis direction;
   a head cover joined to an upper end of the cylinder head in the cylinder axis direction and, in cooperation with the cylinder head, defining a valve operating chamber and a connection passage that are separated from each other; and
   a gas-liquid separator provided with a gas inlet port connected with the connection passage, a gas outlet port connected with an intake system of the internal combustion engine, and an oil discharge port for discharging separated oil,
   wherein:
   the cylinder block includes a first blowby gas passage and a first oil return passage each extending from the crank chamber to an end surface of the cylinder block adjoining the cylinder head;
   the cylinder head includes a second blowby gas passage extending in the cylinder axis direction to connect the first blowby gas passage with the connection passage, an oil return chamber separated from the valve operating chamber by a first partition wall and separated from the second blowby gas passage by a second partition wall, where the oil return chamber is provided with a first oil return hole connected with the oil discharge port, and a second oil return passage connecting the valve operating chamber with the first oil return passage;

the first partition wall is formed with a second oil return hole connecting the oil return chamber with the valve operating chamber;

the second partition wall is formed with a ventilation hole connecting the oil return chamber with the second blowby gas passage to equalize pressure between the oil return chamber, the valve operating chamber, and the crank chamber; and the ventilation hole is located at a vertically higher position than the second oil return hole.

2. The internal combustion engine according to claim 1, wherein the second oil return hole is provided in a part of the first partition wall corresponding to a vertically lower end part of the oil return chamber.

3. The internal combustion engine according to claim 1, wherein the first oil return hole is located at a vertically lower position than the ventilation hole.

4. The internal combustion engine according to claim 1, wherein the ventilation hole is provided in a part of the second partition wall corresponding to a vertically upper end part of the oil return chamber.

5. The internal combustion engine according to claim 1, wherein the second blowby gas passage is formed to have a larger cross-sectional area in an upper part thereof in the cylinder axis direction than in a lower part thereof in the cylinder axis direction.

6. The internal combustion engine according to claim 1, wherein a vertically upper part of the second blowby gas passage branches into a plurality of branch passages such that one of the branch passages is connected with the connection passage and another one of the branch passages is connected with the ventilation hole.

7. The internal combustion engine according to claim 1, wherein the cylinder head has a bearing wall rotatably supporting a camshaft, and an upper part of the second blowby gas passage in the cylinder axis direction is formed in the bearing wall.

8. The internal combustion engine according to claim 7, wherein the bearing wall serves as an end wall constituting an end part of the cylinder head in a crankshaft direction.

9. The internal combustion engine according to claim 7, wherein an upper part of the oil return chamber in the cylinder axis direction is formed in the bearing wall.

10. The internal combustion engine according to claim 1, wherein the second partition wall has a part extending relative to a vertical direction to overhang the oil return chamber.

11. The internal combustion engine according to claim 1, wherein the first partition wall extends in a direction perpendicular to a crankshaft direction to separate the second blowby gas passage and the oil return chamber from the valve operating chamber.

12. The internal combustion engine according to claim 1, wherein two camshafts are supported in the cylinder head, and the second partition wall has a part extending toward a center of one of the camshafts.

13. The internal combustion engine according to claim 1, wherein:

two camshafts are supported in the cylinder head;

a winding transmission body is wound around rotating bodies provided to respective end parts of the camshafts as well as a rotating body provided to an end part of the crankshaft; and the second partition wall has a part extending in parallel with a bisector of an angle defined between imaginary straight lines extrapolating two parts of the winding transmission body that extend in two different directions from the rotating body of one of the camshafts.

14. The internal combustion engine according to claim 1, wherein the second blowby gas passage and the oil return chamber are located adjacent to a downstream end of a cooling water passage formed in the cylinder head.

15. The internal combustion engine according to claim 14, wherein the cooling water passage is provided below the oil return chamber and lateral to the second blowby gas passage.

16. The internal combustion engine according to claim 1, wherein:

the internal combustion engine consists of a V-type internal combustion engine including two cylinder banks offset from each other in a crankshaft direction;

the cylinder head is included in one of the cylinder banks as a first cylinder head and an additional cylinder head having an identical shape as that of the first cylinder head is included in the other of the cylinder banks as a second cylinder head, the first and second cylinder heads being positioned to be reversed relative to each other in the crankshaft direction; and the oil return chambers in the first and second cylinder heads are formed in mutually facing side parts of the first and second cylinder heads.

17. The internal combustion engine according to claim 16, wherein the gas-liquid separator is located between the first and second cylinder heads.

* * * * *